United States Patent
Allison et al.

(10) Patent No.: US 6,311,882 B1
(45) Date of Patent: Nov. 6, 2001

(54) ADAPTOR FOR MOUNTING A SLAT OVER A ROOF DITCH IN A VEHICLE ROOF

(75) Inventors: Alan Richard Allison, Waterford; Richard G. Evans, Lake Leelanau, both of MI (US)

(73) Assignee: JAC Products, Inc., Ann Arbor, MI (US)

( * ) Notice: Subject to any disclaimer, the term of this patent is extended or adjusted under 35 U.S.C. 154(b) by 0 days.

(21) Appl. No.: 09/567,622

(22) Filed: May 9, 2000

(51) Int. Cl.[7] ..................................................... B60R 9/00
(52) U.S. Cl. .................... 224/326; 224/309; 224/330; 224/331; 296/213
(58) Field of Search .................... 224/309, 325, 224/326, 327, 329, 330, 331; 296/37.7, 213

(56) References Cited

U.S. PATENT DOCUMENTS

| | | |
|---|---|---|
| 2,688,504 | 9/1954 | Parker . |
| 3,349,977 | 10/1967 | Caminiti . |
| 3,917,136 * | 11/1975 | Carson ................................ 224/331 |
| 4,022,037 | 5/1977 | Walters . |
| 4,162,755 | 7/1979 | Bott . |
| 4,174,794 | 11/1979 | Bott . |
| 4,270,681 | 6/1981 | Ingram . |
| 4,448,336 | 5/1984 | Bott . |
| 4,630,982 | 12/1986 | Fenner . |
| 4,640,450 * | 2/1987 | Gallion et al. ........................ 224/331 |
| 4,723,696 | 2/1988 | Stichweh et al. . |
| 4,768,691 | 9/1988 | Stapleton . |
| 4,911,348 | 3/1990 | Rasor et al. . |
| 5,244,193 | 9/1993 | Hehr . |
| 5,257,710 * | 11/1993 | Cropley ................................ 224/331 |
| 5,377,890 | 1/1995 | Brunner et al. . |
| 5,636,776 | 6/1997 | Rak et al. . |
| 5,636,954 | 6/1997 | Henderson et al. . |
| 5,746,362 * | 5/1998 | Hickey ................................ 224/331 |
| 5,762,247 | 6/1998 | Cucheran et al. . |
| 5,848,743 * | 12/1998 | Derecktor .......................... 224/331 |
| 5,871,190 * | 2/1999 | Henriksson .................... 248/231.21 |
| 5,975,391 | 11/1999 | Aftanas et al. . |
| 6,182,876 * | 2/2001 | Moliner .............................. 224/321 |

FOREIGN PATENT DOCUMENTS

4140187-A1   12/1991   (DE) .

* cited by examiner

Primary Examiner—Stephen K. Cronin
(74) Attorney, Agent, or Firm—Harness, Dickey & Pierce, PLC

(57) ABSTRACT

An adaptor for securing a slat of a vehicle article carrier to an outer body surface of a vehicle without the need for drilling holes through the outer body surface. The adaptor comprises a main body portion having a channel formed along the entire length thereof. The channel has a cross-sectional shape which is designed to match the shape of an upwardly protruding lip portion formed within a roof ditch of the vehicle, such that the adaptor can be slid over the upwardly extending metal lip portion and thus attached thereto. At least one threaded bore is provided in the adaptor for enabling a slat to be secured thereto by an external threaded fastening element. A second threaded bore is included for enabling a set screw to be used to secure the adaptor to the metal lip portion so as to prevent sliding movement of the adaptor within the roof ditch. The adaptor thus allows a slat to be secured over a roof ditch without the need for drilling any holes in the roof of the vehicle.

15 Claims, 1 Drawing Sheet

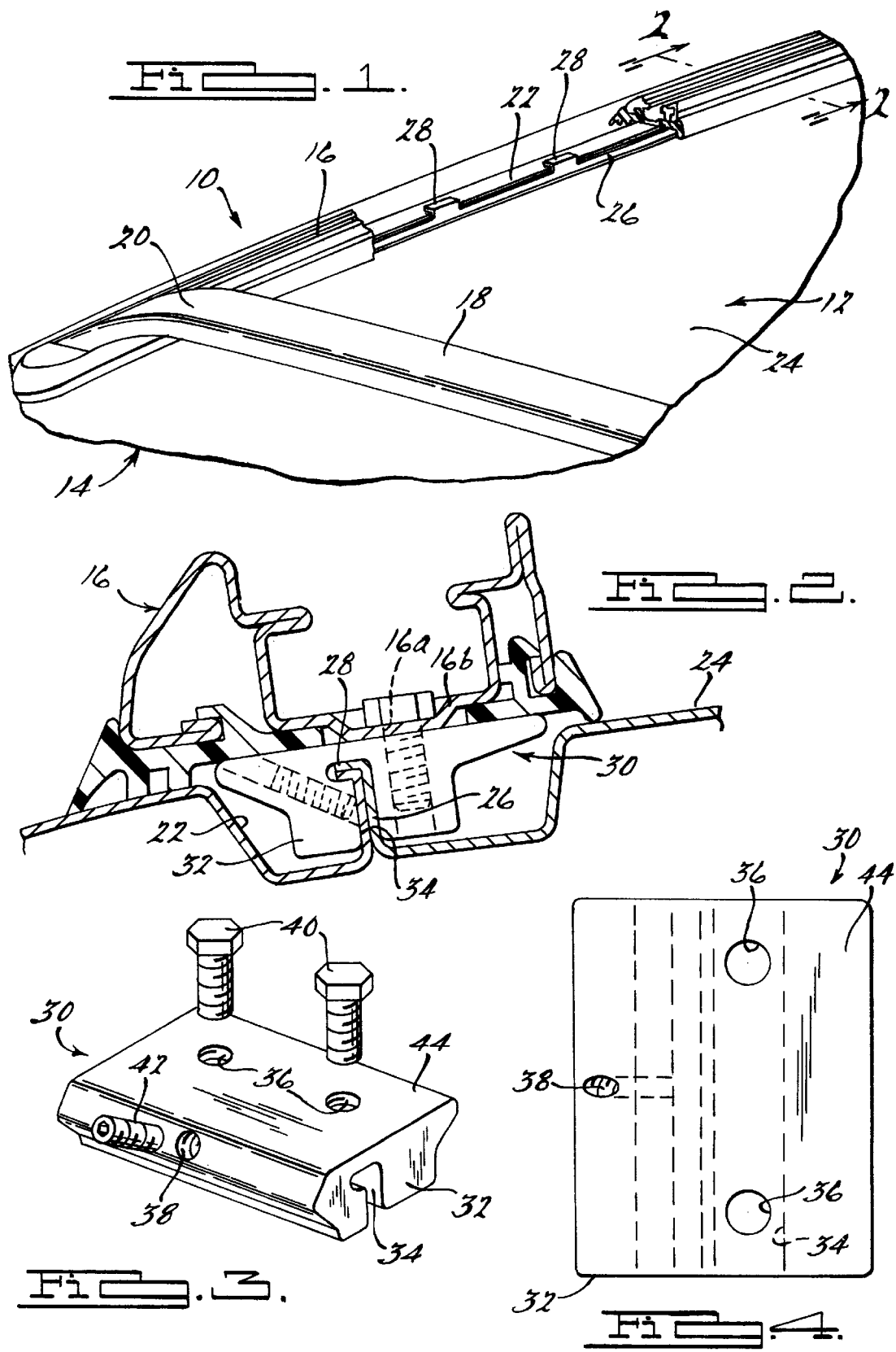

ADAPTOR FOR MOUNTING A SLAT OVER A ROOF DITCH IN A VEHICLE ROOF

BACKGROUND OF THE INVENTION

1. Technical Field

The present invention relates generally to adaptors, and more particularly to an adaptor for mounting a slat of a vehicle article carrier system over a roof ditch formed in an outer body surface of a vehicle, and without the need for drilling holes in the outer body surface.

2. Discussion

Vehicle article carriers are used in a variety of applications to transport various articles above an outer body surface of a vehicle such as a car, sport utility vehicle (SUV) or truck. Such vehicle article carriers typically employ a pair of slats and at least one cross bar extending transversely between the slats. Each of the slats are secured to the outer body surface of the vehicle and typically include channels which engage end support structure at each end of the cross bar to allow the cross bar to be adjustably positioned along the outer body surface as needed to support the article(s) being transported.

Each slat is typically secured by a Rivnut™ fastener or other form of light fastening element to the outer body surface of the vehicle. Of course, this necessitates drilling at least one hole, and typically several holes, in the outer body surface to enable secure mounting of the slat to the outer body surface. As will be appreciated, the drilling of holes in the outer body surface can give rise to various problems. For one, drilling can produce sharp edges and fragments of metal which can come loose and potentially damage the headliner of the vehicle, thus necessitating expensive repairs. Another problem is that drilling leaves an exposed metal surface which may eventually rust or be susceptible to other forms of corrosion. Still further, the drilling of a hole in the outer body surface of the vehicle can eventually result in water leakage therethrough into the interior area of the vehicle, thus damaging the headliner and other interior components.

Accordingly, there is a significant need for a means for attaching an article carrier component such as a slat to an outer body surface of a vehicle without the need for drilling any holes in the outer body surface.

There is further a need for a means for securing an article carrier component such as a slat to an outer body surface, wherein the slat can be secured over the roof ditch of the vehicle, and to existing structure within the roof ditch, in such a manner that no drilling of holes in the roof ditch is required.

It is still a further object of the present invention to provide an adaptor for securing an article carrier component such as a slat to an outer body surface of a vehicle over a roof ditch formed in the outer body surface, where the adaptor is completely concealed from view once the slat is secured over the roof ditch, and where the adaptor allows attachment of the slat to the outer body surface while maintaining a low profile appearance of the slat on the outer body surface.

SUMMARY OF THE INVENTION

The present invention is directed to an adaptor specifically adapted for use in securing an article carrier component, such as the slat, to an outer body surface of a vehicle over a roof ditch formed in the outer body surface. In this regard it will be appreciated that the roof ditch typically includes an upwardly extending lip portion which is formed during construction of the vehicle. The actual shape of the lip portion may vary considerably, but the metal lip portion in every instance will extend upwardly from a bottom surface of the roof ditch and thus forms a sturdy element which can be used for attaching a slat, via the adaptor of the present invention, to the outer body surface of the vehicle.

The adaptor generally comprises a main body portion having a channel formed along the length thereof. The channel is formed so as to match the cross sectional shape of the metal lip portion of the roof ditch. Thus, it will be appreciated that the adaptor is designed specifically for use with the roof ditch of a specific vehicle.

The adaptor further includes a first bore, which is preferably a threaded bore, and a second bore which is also preferably threaded. The main body portion has a cross sectional shape permitting it to be disposed within the roof ditch in a manner such that the main body portion does not project outwardly of the roof ditch, and which therefore permits the adaptor to be completely concealed within the roof ditch when the slat is secured over the roof ditch. The first bore permits a threaded fastening element to be used to secure the slat to the adaptor. The second bore permits a set screw to be used to secure the adaptor to the metal lip portion at a desired position in the roof ditch.

When the adaptor is secured within the roof ditch, an upper surface of the main body portion is substantially flush with the outer body surface of the vehicle. Thus, the adaptor does not alter the otherwise low profile of the slat when the slat is secured to the outer body surface. Advantageously, the adaptor is completely concealed under the slat within the roof ditch.

The adaptor of the present invention thus permits the slat to be secured over a roof ditch of a vehicle without the need for drilling any holes in the outer body surface of the vehicle. This completely eliminates the potential for metal debris being formed during the drilling of one or more holes in the outer body surface, the potential for corrosion of exposed metal edges, and the potential for water leakage problems because of holes drilled in the outer body surface.

BRIEF DESCRIPTION OF THE DRAWINGS

The various advantages of the present invention will become apparent to one skilled in the art by reading the following specification and subjoined claims and by referencing the following drawings in which:

FIG. 1 is a perspective view of a roof portion of a vehicle illustrating a typical vehicle article carrier secured to the outer body surface with a portion of one slat broken away to expose the roof ditch formed in the outer body surface;

FIG. 2 is a cross sectional end view of one slat taken in accordance with section line 2—2 in FIG. 1 illustrating an adaptor of the present invention disposed within a roof ditch in the outer body surface, and being used to secure the slat to the outer body surface;

FIG. 3 is a perspective view of a preferred embodiment of the adaptor of the present invention; and FIG. 4 is a bottom view of the adaptor of FIG. 3.

DETAILED DESCRIPTION OF THE PREFERRED EMBODIMENTS

Referring to FIG. 1, there is shown a vehicle article carrier 10 secured to an outer body surface 12 of a motor vehicle 14. The vehicle article carrier 10 typically includes a pair of slats 16 (only one being illustrated) which are disposed on the outer body surface 12 usually approximately parallel to one another and along a major longitudinal length of the vehicle 14. At least one, and preferably a pair, of cross bars 18 are used to support articles above the outer body surface 12. Each cross bar 18 has a pair of end supports 20 (only one being shown) at opposite ends thereof which are supported on the slats 16. Preferably at least one of the cross bars 18 can be moved slidably along the slats 16 to allow for adjustable positioning to accommodate articles having various dimensions.

FIG. 1 also illustrates one of the roof ditches 22 which are formed in the outer body surface 12 during manufacture of the vehicle 14. The roof ditch 22 extends along a major portion of the length of a roof 24 of the vehicle and includes an upwardly extending metal lip portion 26. The metal lip portion 26 typically includes a plurality of transversely extending flanges 28 which may vary significantly in overall width and cross-sectional shape. The metal lip portion 26 and flanges 28 form an extremely strong structural portion of the vehicle.

Referring now to FIG. 2, an adaptor 30 in accordance with a preferred embodiment of the present invention is illustrated. The adaptor 30 is adapted to reside within the roof ditch 22 in a manner that allows an associated slat 16 to be secured to the roof 24 without the need for drilling holes through the roof or within the roof ditch 22.

With reference to FIGS. 3 and 4, the adaptor 30 can be seen in greater detail. The adaptor 30 includes a main body portion 32 having an inverted, L-shaped channel 34 formed preferably along the entire length thereof. The channel 34 has a cross-sectional shape which is specifically designed to match the cross-sectional 5 shape of the metal lip portion 26 and flange 28 of the roof ditch 22. Thus, the adaptor 30 is specifically designed for use with the roof ditch of a particular vehicle.

The main body portion 32 of the adaptor 30 also includes at least one first bore 36, and more preferably a pair of first bores 36, and at least one second bore 38. Each of the first bores 36 and the second bore 38 are preferably threaded. The first bores 36 receive threaded fastening elements 40, which extend through openings 16a in a bottom wall 16b of each slat 16 such that the fastening elements 40 can be used to secure an associated one of the slats 16 to the adaptor 30. Bore 38 receives a set screw 42 therethrough to permit the adaptor 30 to be secured at a desired position along the metal lip portion 26.

Referring further to FIG. 2, the adaptor 30 is installed by sliding it over a portion of the metal lip 26 portion where the flange 28 is present. Set screw 42 can then be tightened to secure the adaptor 30 to prevent movement along the metal lip portion 26. As will also be noted in FIG. 2, the adaptor 30 includes an upper surface 44 which is substantially flush with the roof 24 when the adaptor 30 is secured within the roof ditch 22. Thus, the adaptor 30 does not alter the low profile appearance of the slat 16 and is further completely concealed within the roof ditch 22 underneath the slat 16.

The adaptor 30 may vary widely in dimensions and cross-sectional shape. The important factors are that it is able to fit within the roof ditch 22 of the vehicle 14 with which it is designed to be used in such a manner that it is preferably concealed therewithin once the slat 16 is secured over the roof ditch 22. Also, it is strongly preferred that the specific shape of the adaptor 30 does not raise the overall profile of the slat 16 once the slat is attached thereto.

The adaptor 30 may be made from a wide variety of materials such as plastic or metal. In one preferred form, the adaptor 30 is comprised of an extruded aluminum block. Obviously, the adaptor could be molded or extruded from a suitably high strength plastic. While the adaptor 30 has been illustrated as a single piece component, it will be appreciated that it could just as easily be constructed as a two-piece or multi-piece component if desired. It is anticipated, however, that the most economical form of manufacture of the adaptor will be as an extruded aluminum, single-piece component.

A principal advantage of the adaptor 30 is that it enables a slat to be secured to the outer body surface of a vehicle without the need for drilling any holes in the outer body surface. Thus, the adaptor of the present invention completely eliminates the risk of water leakage through any such holes. Since there is no need for drilling any holes, the risk of metal debris being created which might eventually damage interior components of the vehicle is eliminated. Furthermore, the possibility of corrosion such as rust developing on an exposed metal edge of a drilled hole is eliminated by the use of the adaptor of the present invention.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, specification and following claims.

What is claimed is:

1. An adaptor for securing a slat of a vehicle article carrier to an outer body surface of a vehicle over a roof ditch formed in the outer body surface, the adaptor comprising:

a main body portion;

a channel formed along a major length of the main body portion, said channel having a cross-sectional shape specifically adapted to engage with a metal lip extending upwardly within said roof ditch such that said main body portion cannot be lifted upwardly away from said roof ditch when said metal lip is disposed within said channel; and a first bore formed in said main body portion adapted to receive a threaded fastening element to permit said slat to be secured to said main body portion.

2. The adaptor of claim 1, wherein said main body portion further comprises a threaded bore adapted to receive a set screw for securing said main body portion to said metal lip to thereby prevent sliding movement of said main body portion within said roof ditch.

3. The adaptor of claim 1, further comprising a pair of said first bores, and wherein each said first bore is threaded.

4. The adaptor of claim 1, wherein said main body portion has an upper surface, and wherein said upper surface is substantially flush with said outer body surface of said vehicle when said main body portion is secured within said roof ditch.

5. An adaptor for securing a slat of a vehicle article carrier to an outer body surface of a vehicle over a roof ditch formed in the outer body surface, the adaptor comprising:

a main body portion;

a channel formed along the entire length of the main body portion, said channel having a cross-sectional shape specifically adapted to engage with a metal lip extending upwardly within said roof ditch such that said main body portion cannot be lifted upwardly away from said roof ditch when said metal lip is disposed within said channel;

a first bore formed in said main body portion adapted to receive a threaded fastening element to permit said slat to be secured to said main body portion; and a second bore formed in said main body portion adapted to receive a set screw for securing said main body portion to said metal lip to thereby prevent said main body portion from sliding in said roof ditch.

6. The adaptor of claim 5, wherein said main body portion comprises an upper surface, and wherein said upper surface is disposed substantially flush with said outer body surface when said main body portion is disposed within said roof ditch.

7. The adaptor of claim 5, wherein said channel comprises an inverted L-shaped channel.

8. The adaptor of claim 5, wherein said main body portion is formed from aluminum.

9. The adaptor of claim 5, wherein said main body portion is formed from plastic.

10. The adaptor of claim 5, wherein said main body portion is formed from metal.

11. An adaptor for residing within a roof ditch in an outer body surface of a vehicle and for securing a slat of a vehicle article carrier to the outer body surface of the vehicle over the roof ditch and without the need for drilling holes in the outer body surface, the adaptor comprising:

a main body portion;

a channel formed along the entire length of the main body portion, said channel having an inverted L-shape when viewed in cross-section, and specifically adapted to engage with a metal lip extending upwardly within said roof ditch such that said main body portion cannot be lifted upwardly away from said roof ditch when said metal lip is disposed within said channel;

a first bore formed in said main body portion adapted to receive a threaded fastening element to permit said slat to be secured to said main body portion without the need for drilling a hole in the outer body surface;

a second bore formed in said main body portion and opening into said channel to receive a set screw for securing said main body portion to said metal lip to thereby prevent said main body portion from sliding in said roof ditch; and wherein said main body portion has an upper surface, and wherein said upper surface is disposed substantially flush with said outer body surface when said main body portion is secured within said roof ditch.

12. The adaptor of claim 11, wherein said main body portion is comprised of metal.

13. The adaptor of claim 11, wherein said main body portion is comprised of plastic.

14. The adaptor of claim 11, wherein said main body portion is comprised of aluminum.

15. The adaptor of claim 11, wherein said main body portion is formed by extruding it from aluminum.

* * * * *